(12) United States Patent
Oshika et al.

(10) Patent No.: US 7,436,943 B2
(45) Date of Patent: Oct. 14, 2008

(54) METHOD AND APPARATUS FOR MANAGING TELEPHONE NUMBER, AND COMPUTER PRODUCT

(75) Inventors: Hironobu Oshika, Yokohama (JP); Kazutoshi Kobayashi, Yokohama (JP); Takashi Ueno, Yokohama (JP); Shoichi Kimura, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 580 days.

(21) Appl. No.: 11/169,770

(22) Filed: Jun. 30, 2005

(65) Prior Publication Data

US 2006/0233351 A1    Oct. 19, 2006

(30) Foreign Application Priority Data

Mar. 25, 2005  (JP) .............................. 2005-088801

(51) Int. Cl.
 *H04M 3/42*    (2006.01)

(52) U.S. Cl. ................................................ 379/201.11
(58) Field of Classification Search ............. 379/201.11
See application file for complete search history.

(56) References Cited

FOREIGN PATENT DOCUMENTS

JP        2002-261935        9/2002

*Primary Examiner*—Alexander Jamal
(74) *Attorney, Agent, or Firm*—Hanify & King, P.C.

(57) ABSTRACT

A storing unit stores a regular telephone number of a user and a provisional telephone number corresponding to the regular telephone number. An acquiring unit acquires a provisional telephone number of a receiver and a regular telephone number of a caller who called at the provisional telephone number of the receiver. A searching unit searches a regular telephone number corresponding to the provisional number of the receiver from the storing unit. A call establishing unit establishes a call between the caller and the receiver corresponding to the regular telephone number searched.

9 Claims, 15 Drawing Sheets

FIG.3

ID/PASSWORD-MANAGEMENT TABLE

| GROUP ID | PASSWORD |
|---|---|
| AAA | xxxx |
| BBB | yyyy |
| CCC | zzzz |

FIG.4

SUBSCRIBER-NUMBER MANAGEMENT TABLE

| USER NAME | FORMAL NUMBER | E-MAIL ADDRESS | GROUP ID | REDIAL | TEMPORARY NUMBER |
|---|---|---|---|---|---|
| A | 090-aaaa-xxxx | ○○○○ | AAA | DISAPPROVED | |
| B | 090-bbbb-yyyy | ×××× | AAA | Reserve(3Day) | 0120-xxxx-yyyy |
| C | 090-cccc-zzzz | △△△△ | AAA | DISAPPROVED | |
| D | 090-dddd-pppp | □□□□ | BBB | DISAPPROVED | |
| E | 090-eeee-qqqq | ○×○× | BBB | DISAPPROVED | |

ONE-TIME-NUMBER MANAGEMENT TABLE

| SERIAL NUMBER | FORMAL NUMBER | USAGE STATUS |
|---|---|---|
| 1 | | NOT IN USE |
| 2 | 090-xxyy-zzzz | IN USE |
| 3 | 090-xxxx-yyyy | 3Day |
| ⋮ | ⋮ | ⋮ |
| 9999 | | NOT IN USE |
| 10000 | | NOT IN USE |

FIG.6

HISTORY-INFORMATION MANAGEME

| GROUP ID | USER NAME | SERIAL NUMBER | RECEIVER | TIME OF OUTGOING CALL | CALLER | TIME OF INCOMING CALL |
|---|---|---|---|---|---|---|
| AAA | A | 1 | B | 2004/12/20 11:05 | C | 2004/12/20 13:40 |
| AAA | A | 2 | C | 2004/12/19 14:20 | S | 2004/12/20 11:25 |
| AAA | A | 3 | C | 2004/11/19 10:10 | S | 2004/12/19 21:45 |
| AAA | B | 1 | Z | 2004/12/19 20:35 | G | 2004/12/19 19:21 |
| AAA | B | 2 | F | 2004/12/02 18:49 | J | 2004/12/01 06:40 |
| BBB | N | 1 | M | 2004/12/19 13:52 | M | 2004/12/19 13:05 |
| BBB | N | 2 | M | 2004/12/19 12:03 | M | 2004/12/19 11:52 |

METHOD AND APPARATUS FOR MANAGING TELEPHONE NUMBER, AND COMPUTER PRODUCT

BACKGROUND OF THE INVENTION

1. Field of the Invention

The present invention relates to a technology for preventing a leakage of personal information such as a telephone number while establishing a telephone call quickly and efficiently.

2. Description of the Related Art

Conventionally, when a user uses a telephone terminal such as a cellular telephone to make a call, the user dials a telephone number of a destination. To facilitate the dialing process, the telephone terminal is typically provided with functions such as a phonebook function, an abbreviated dialing function, and an outgoing/incoming call register function.

However, if the user looses the telephone terminal, personal information registered in these functions can be leaked and illegally misused by a malicious third party.

To solve this problem, Japanese Patent Application Laid Open No. 2002-261935 discloses a technology for generating a provisional telephone number corresponding to a regular telephone number. Thus, if a user notifies another party of the provisional number, the user can receive a call from the other party without notifying the regular number.

However, the conventional technology is inefficient because the user needs to notify the other party of the provisional number.

Moreover, the provisional number expires after a predetermined time duration to enhance security. Therefore, the user is required to take the trouble of notifying the other party of the provisional number each time he wants to receive a call.

Thus, it is imperative to devise a technology for preventing leakage of personal information such as telephone numbers while establishing telephone calls quickly and efficiently.

SUMMARY OF THE INVENTION

It is an object of the present invention to at least solve the problems in the conventional technology.

An apparatus according to one aspect of the present invention, which is for managing information regarding a telephone number of a user, includes a storing unit that stores a regular telephone number of the user and a provisional telephone number corresponding to the regular telephone number; an acquiring unit that acquires a provisional telephone number of a receiver and a regular telephone number of a caller who called at the provisional telephone number of the receiver; a searching unit that searches a regular telephone number corresponding to the provisional number of the receiver from the storing unit; and a call establishing unit that establishes a call between the caller and the receiver corresponding to the regular telephone number searched.

A method according to another aspect of the present invention, which is for managing information regarding a telephone number of a user, includes storing a regular telephone number of the user and a provisional telephone number corresponding to the regular telephone number; acquiring a provisional telephone number of a receiver and a regular telephone number of a caller who called at the provisional telephone number of the receiver; searching a regular telephone number corresponding to the provisional number of the receiver from the regular telephone number of the user stored at the storing; and establishing a call between the caller and the receiver corresponding to the regular telephone number searched.

A computer-readable recording medium according to still another aspect of the present invention stores a computer program that causes a computer to execute the above method according to the present invention.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is an example of an ID/password management table;

FIG. 4 is an example of a subscriber-number management table;

FIG. 6 is an example of a history-information management table;

DETAILED DESCRIPTION OF THE PREFERRED EMBODIMENTS

Exemplary embodiments of the present invention will be described below with reference to the accompanying drawings. It should be noted that the present invention is not limited to these embodiments.

A telephone number management server (hereinafter, "server") according to the present embodiment stores identification data for identifying a user with the user's regular telephone number (hereinafter, "regular number") in a storing unit. When a request is received from a caller to provide a provisional telephone number (hereinafter, "provisional number") of a receiver, the server generates a provisional number, associates the provisional number with the receiver's regular number, and notifies the caller of the provisional number.

When the receiver's provisional number and the caller's regular number are received from the caller, the server searches the receiver's regular number from the storing unit and notifies a telephone exchange (hereinafter, "exchange") of the regular number, to establish a call between the caller and the receiver.

Thus, by using the server, users can efficiently call each other without knowing the other's regular number. Moreover, a regular number is prevented from being leaked and illegally misused by a malicious third party.

Figure 1:
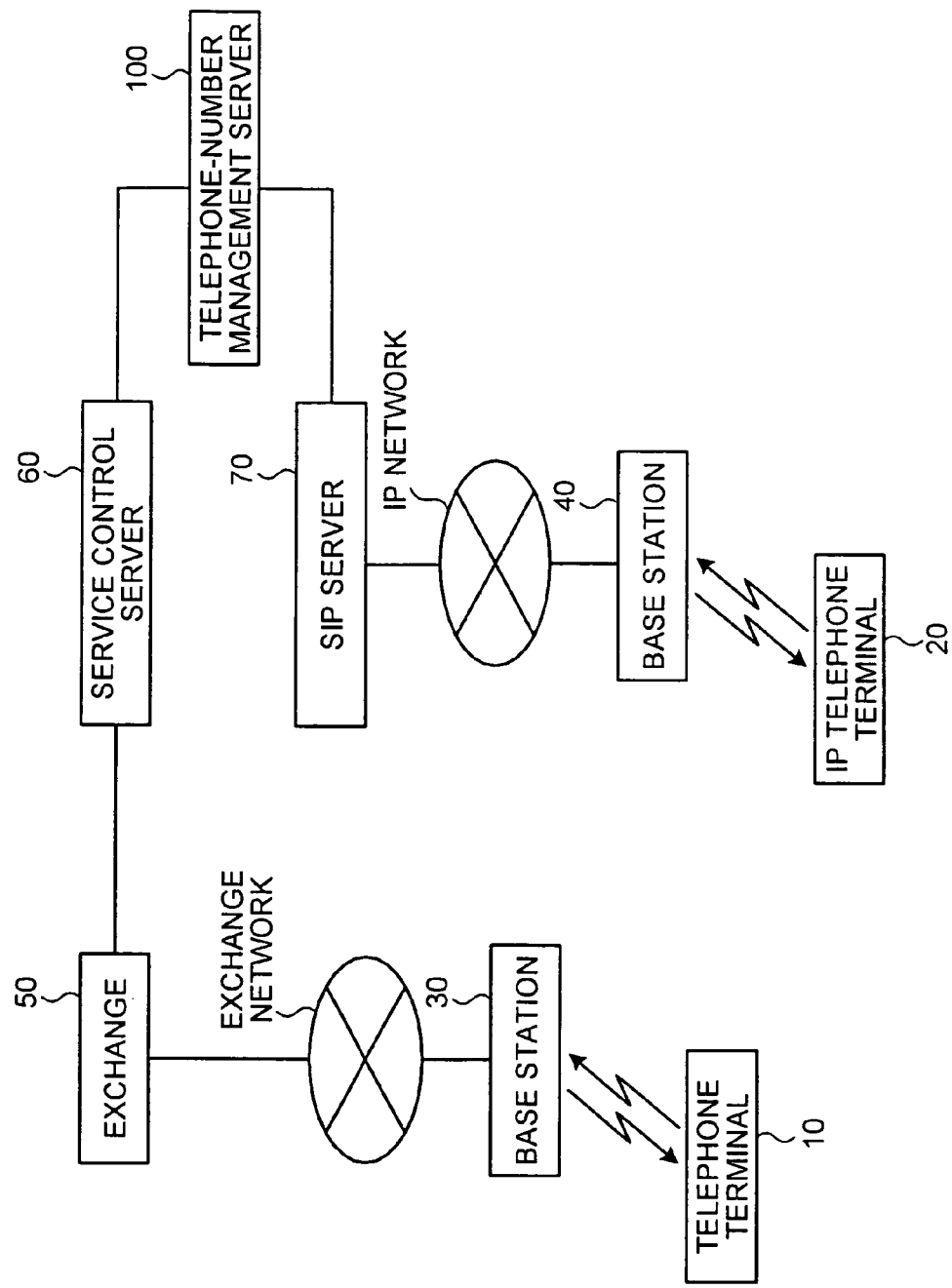
FIG. 1 is a diagram of a telephone-number management system according to an embodiment of the present invention.

FIG. 1 is a diagram of a telephone-number management system according to an embodiment of the present invention. The telephone-number management system includes a telephone-number management server 100 that is connected to a service control server 60 and a session initiation protocol (SIP) server 70. The SIP server 70 is connected to a base station 40 though an internet protocol (IP) network.

The service control server 60 is connected to an exchange 50, and the exchange 50 is connected to a base station 30 through an exchange network. A telephone terminal 10 and an IP telephone terminal 20 communicate through the base station 30 and the base station 40, respectively, by wireless communication.

The telephone terminal 10 is, for example, a cellular telephone that is used to make calls through a telephone network. The IP telephone terminal 20 is, for example, an internet telephone that is used to make calls through the Internet.

When the base station 30 receives information (including a caller's regular number, a receiver's provisional number etc.) from the telephone terminal 10, the base station 30 transmits the information to the exchange 50 through the exchange network. When the base station 30 receives information (including a receiver's provisional number etc.) through the exchange network transmitted from the exchange 50 to the telephone terminal 10, the base station 30 transmits the information to the telephone terminal 10.

When the base station 40 receives information from the IP telephone terminal 20 (including a caller's regular number, a receiver's provisional number etc.), the base station 40 transmits the information to the SIP server 70 through the IP network. When the base station 40 receives information (including a receiver's provisional number etc.) through the IP network transmitted from the SIP server 70 to the IP telephone terminal 20, the base station 40 transmits the information to the IP telephone terminal 20.

The exchange 50 requests the service control server 60 to provide a receiver's regular number, and requests an exchange (not shown) on the receiver's side to call the receiver. Specifically, the exchange 50 transmits an initial DP to the service control server 60 (the initial DP includes a caller's regular number and a receiver's provisional number etc.). The exchange 50 then receives the receiver's regular number and zone area from the service control server 60, and requests the exchange on the receiver's side to call the receiver's telephone terminal based on the information received.

When the service control server 60 receives the initial DP from the exchange 50, the service control server 60 requests the telephone-number management server 100 to convert the receiver's provisional number included in the initial DP to a corresponding regular number. When the receiver's regular number is acquired, the service control server 60 transmits the receiver's regular number and the caller's regular number to the exchange 50.

When the SIP server 70 receives a caller's regular number and a receiver's provisional number from the IP telephone terminal 20 through the base station 40, the SIP server 70 requests the telephone-number management server 100 to convert the receiver's provisional number to a corresponding regular number. When the receiver's regular number is acquired, the SIP server 70 makes a request to call the receiver's IP telephone terminal.

The telephone-number management server 100 manages regular numbers of users. When the telephone-number management server 100 receives a request to convert a receiver's provisional number to a regular number from the service control server 60 or the SIP server 70, the telephone-number management server 100 converts the receiver's provisional number to the regular number, and notifies the service control server 60 or the SIP server 70 of the regular number. In this example, only a single telephone number management server is shown for the matter of convenience. However, a plurality of telephone number management servers can be employed to disperse the load.

Figure 2:
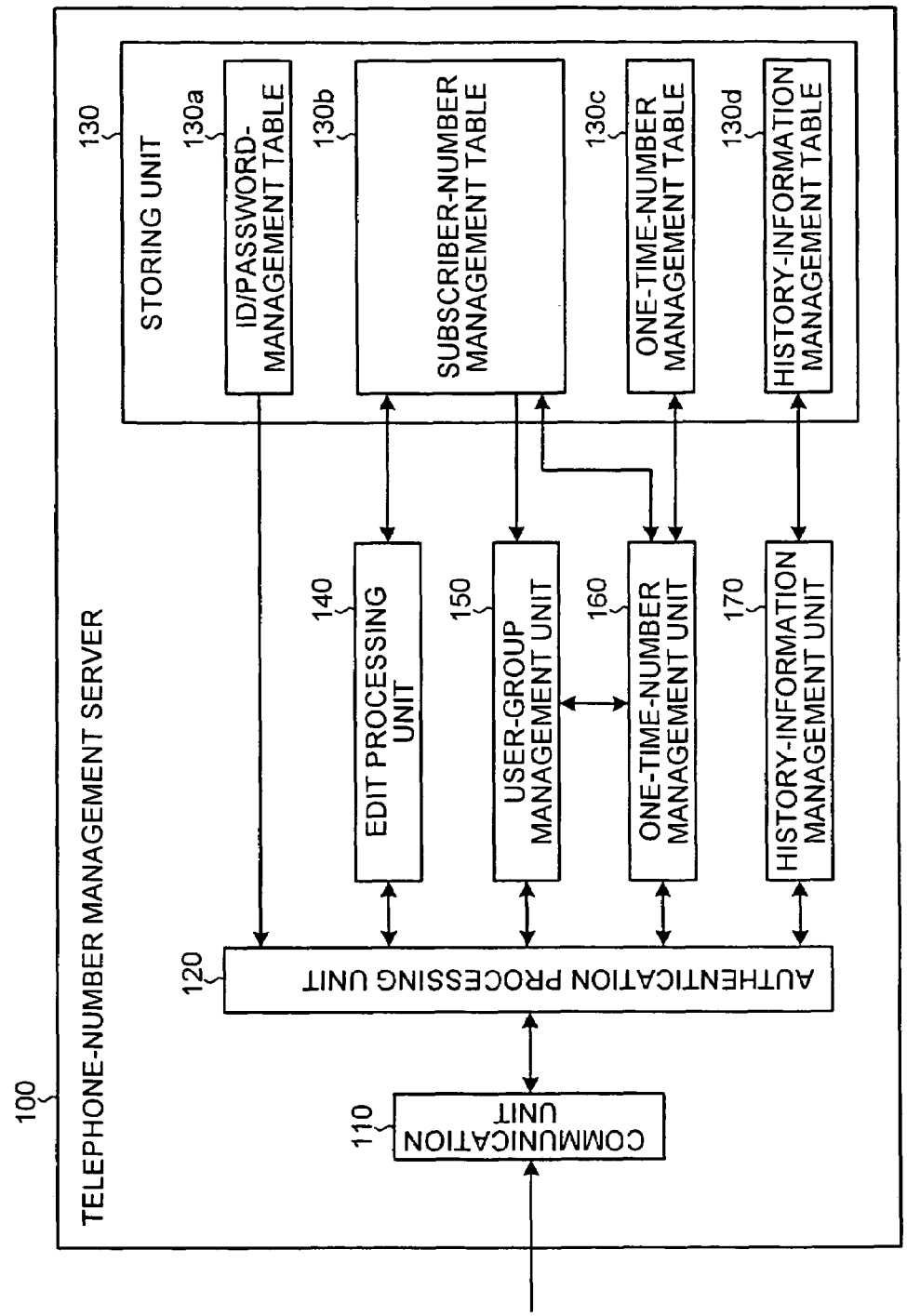
FIG. 2 is a functional block diagram of a telephone-number management server according to the present embodiment.

FIG. 2 is a functional block diagram of the telephone-number management server 100. The telephone-number management server 100 includes a communication unit 110, an authentication processing unit 120, a storing unit 130, an edit processing unit 140, a user-group management unit 150, a one-time-number management unit 160, and a history-information management unit 170.

The communication unit 110 uses a predetermined communication protocol to communicate with the service control server 60 and the SIP server 70. When the authentication processing unit 120 receives a request to access the telephone-number management server 100 from the telephone terminal 10 or the IP telephone terminal 20, the authentication processing unit 120 authenticates the user of the terminal from which the request is made (hereinafter, requesting terminal) based on an ID/password-management table 130a stored in the storing unit 130.

FIG. 3 is an example of the ID/password management table 130a. The ID/password management table 130a includes items of "group identification (ID)" and "password". The group ID is used to identify a group to which a user belongs, and the password is used to authenticate a user belonging to the corresponding group. Specifically, a password "xxxx" corresponds to a group ID "AAA", a password "yyyy" corresponds to a group ID "BBB", and a password "zzzz" corresponds to a group ID "CCC".

When the edit processing unit 140 receives, from the telephone terminal 10 or the IP telephone terminal 20 through the authentication processing unit 120, a request to make a new registration or a revision in user information, the edit processing unit 140 registers new or revised information received from the requesting terminal in a subscriber-number management table 130b stored in the storing unit 130.

FIG. 4 is an example of the subscriber-number management table 130b. The subscriber-number management table 130b includes items of "user name" used for identifying a user, "regular number" of the user, "e-mail address" of the user, "group ID" of the user, and "provisional number" of the user. Moreover, the subscriber-number management table 130b includes an item of "redial" for indicating whether the user approves that the provisional number can be redialed.

For example, information corresponding to a user with a user name "A" includes a regular number "090-aaaa-xxxx", an e-mail address "oooo", and a group ID "AAA". Moreover, redialing is "disapproved", and the provisional number is "none (not determined)". Descriptions for user names "B" to "E" are omitted. Users with user names "A, B, and C" belong to a group specified by the group ID "AAA", and users with user names "D and E" belong to a group specified by a group ID "BBB".

When the user-group management unit 150 receives a request to provide a receiver's provisional number from the telephone terminal 10 or the IP telephone terminal 20 through the authentication processing unit 120, the user-group management unit 150 notifies the requesting terminal of the receiver's provisional number.

Specifically, when such a request is received, the user-group management unit 150 displays at the requesting terminal, a list of user names included in the subscriber-number management table 130b. When a user name is selected at the requesting terminal, the user-group management unit 150 passes the selected user name to the one-time-number management unit 160.

The user-group management unit 150 then acquires a provisional number corresponding to the receiver's user name from the one-time-number management unit 160, notifies the requesting terminal of the provisional number, and registers the provisional number in the subscriber-number management table 130b.

Instead of displaying all of the user names registered in the subscriber-number management table 130b at the requesting terminal, the user-group management unit 150 can display only user names belonging to the same group. For example, if the caller's user name is "A", only the user names "B and C" belonging to the same group as "A" are displayed.

The one-time-number management unit 160 generates a provisional number. Moreover, when a receiver's provisional number is received from the telephone terminal 10 or the IP telephone terminal 20, the one-time-number management unit 160 converts the provisional number to a regular number. Specifically, when the one-time-number management unit 160 acquires a user name from the user-group management unit 150, the one-time-number management unit 160 generates a provisional number corresponding to the user name, and passes the generated provisional number to the user-group management unit 150. The one-time-number management unit 160 also generates a provisional number corresponding to a caller's regular number. A provisional number is determined based on "a number recognized by a server + a random value".

When the one-time-number management unit 160 generates a provisional number, the one-time-number management unit 160 determines whether the same number is already registered in the subscriber-number management table 130b. When the same number is already registered, the one-time-number management unit 160 changes the generated provisional number to a different number.

Figure 5:
FIG. 5 is an example of a one-time-number management table.

The one-time-number management unit 160 records a usage status of a provisional number in a one-time-number management table 130c stored in the storing unit 130. FIG. 5 is an example of the one-time-number management table 130c. The one-time-number management table 130c includes items of "serial number", "regular number", and "usage status". The "usage status" indicates whether a provisional number corresponding to the "regular number" is being used.

For example, a provisional number corresponding to a regular number "090-xxyy-zzzz" of serial number "2" is "in use". A provisional number corresponding to a regular number "090-xxxx-yyyy" of serial number "3" is "in use" and has a duration of three days. The one-time-number management unit 160 sets a duration by referring to the item of "redial" in the subscriber-number management table 130b. For example, if a user approves that the provisional number can be redialed within a duration of three days, the duration of the provisional number becomes three days.

When the one-time-number management unit 160 generates a provisional number, the one-time-number management unit 160 sets the usage status as "in use". After the duration elapses, the one-time-number management unit 160 sets the usage status as "not in use" and erases the provisional number from the subscriber-number management table 130b. When a specific time-duration (e.g. three days) is registered as the usage status, the one-time-number management unit 160 sets the usage status to "not in use" and erases the provisional number from the subscriber-number management table 130b when three days elapses after the registration.

Moreover, when the one-time-number management unit 160 receives a receiver's provisional number and a caller's regular number from the telephone terminal 10 or the IP telephone terminal 20 through the authentication processing unit 120, the one-time-number management unit 160 searches a regular number corresponding to the provisional number from the subscriber-number management table 130b, and notifies the service control server 60 or the SIP server 70 of the searched regular number. For example, referring to FIG. 4, when the provisional number received is "0120-xxxx-yyyy", the regular number is "090-bbbb-yyyy".

When the one-time-number management unit 160 notifies the service control server 60 or the SIP server 70 of the receiver's regular number, the one-time-number management unit 160 determines whether to notify the caller's provisional number by referring to the item of "redial" in the subscriber-number management table 130b.

Specifically, when redialing is "disapproved", the one-time-number management unit 160 notifies the service control server 60 or the SIP server 70 of the caller's identification data stored in the telephone-number management server 100 and the receiver's regular number. When "reserve" is indicated at the item of "redial", the one-time-number management unit 160 notifies the service control server 60 or the SIP server 70 of the caller's provisional number (in this case, the telephone-number management server 100 searches the caller's provisional number from the subscriber-number management table 130b by the caller's regular number), in addition to the receiver's regular number.

The history-information management unit 170 registers, as history information, past calls of a caller and a receiver in a history-information management table 130d stored in the storing unit 130. Moreover, when the history-information management unit 170 receives a request to notify history information from the telephone terminal 10 or the IP telephone terminal 20, the history-information management unit 170 notifies the requesting terminal of the information registered in the history-information management table 130d.

FIG. 6 is an example of the history-information management table 130d. The history-information management table 130d includes items of "group ID", "user name", "serial number", "receiver", "time of outgoing call", "caller", and "time of incoming call".

For example, history information of a user with a user name "A" belonging to group ID "AAA" at serial number "1" is described as follows. The user "A" made call to a receiver "B" on "2004 Dec. 20" at "11:05", and received a call from a caller "C" on "2004 Dec. 20" at "13:40".

Figure 7:
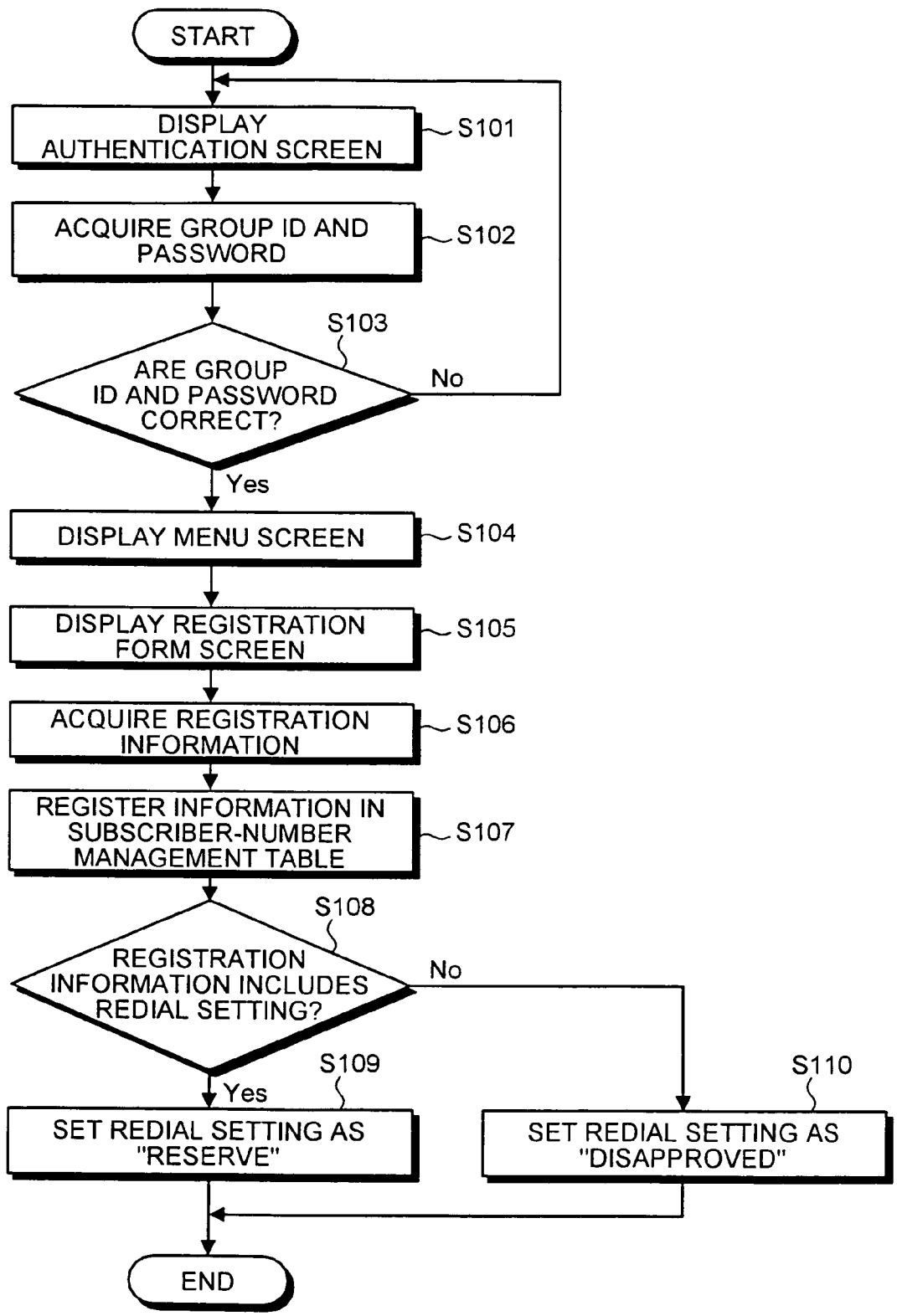
FIG. 7 is a flowchart of a processing procedure performed by the telephone-number management server for registering user information.

FIG. 7 is a flowchart of a processing procedure performed by the telephone-number management server 100 for registering user information. When the authentication processing unit 120 receives a request to access the telephone-number management server 100 from the telephone terminal 10 or the IP telephone terminal 20, the authentication processing unit 120 displays, at the requesting terminal, an authentication screen 100a shown in FIG. 8 (step S101).

When a user of the requesting terminal inputs a group ID and a password in the authentication screen 100a, the authentication processing unit 120 acquires the group ID and the password (step S102), and determines whether the group ID and the password are correct by referring to the ID/password management table 130a (step S103). When the group ID and the password are incorrect (No at step S103), the system control returns to step S101.

Figure 8:
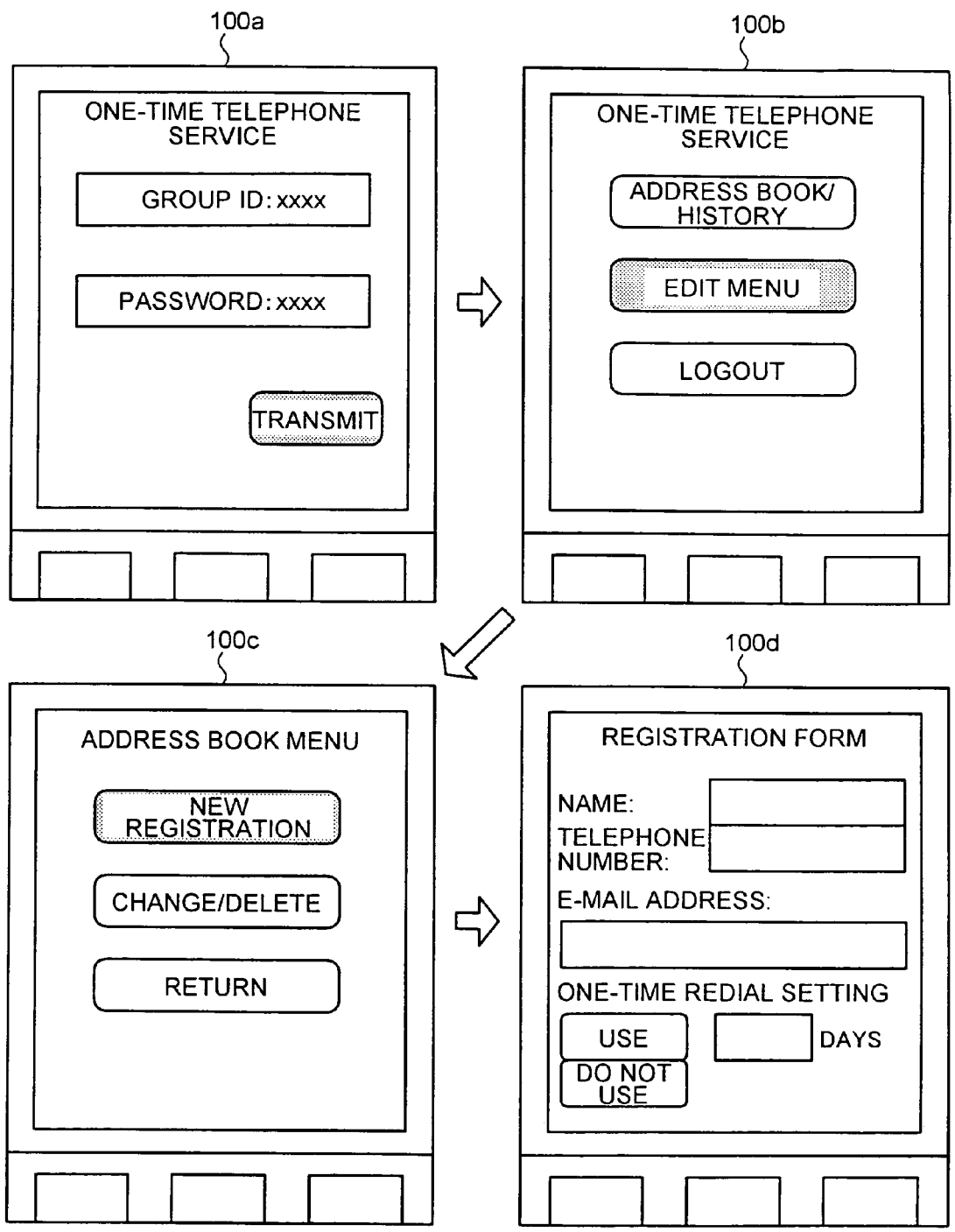
FIG. 8 is an example of screens displayed at a telephone terminal requesting for an access to the telephone-number management server.

On the other hand, when the group ID and the password are correct (Yes at step 103), the authentication processing unit 120 displays, at the requesting terminal, the menu screen 100b shown in FIG. 8 (step S104). When the user selects "edit menu" in the menu screen 100b, the authentication processing unit 120 displays, at the requesting terminal, an address-book edit menu 100c shown in FIG. 8. When the user selects "new registration" in the address-book edit menu 100c, the authentication processing unit 120 displays, at the requesting terminal, a registration form 100d shown in FIG. 8 (step S105).

When the user inputs registration information in the registration form 100d, the edit processing unit 140 acquires the registration information (step S106), registers the registration information in the subscriber-number management table 130b (step S107), and determines whether the registration information includes a redial setting (step S108).

When the registration information includes a redial setting (Yes at step S108), the edit processing unit 140 sets "reserve" at the item of "redial" in the subscriber-number management table 130b (step S109). When the registration information does not include a redial setting (No at step S108), the edit processing unit 140 sets "disapproved" at the item of "redial" in the subscriber-number management table 130b (step S110).

Accordingly, the authentication processing unit 120 authenticates user, and the edit processing unit 140 registers, in the subscriber-number management table 130b, information input by the user at the registration form 100d. Thus, the information is registered properly and efficiently.

Figure 9:
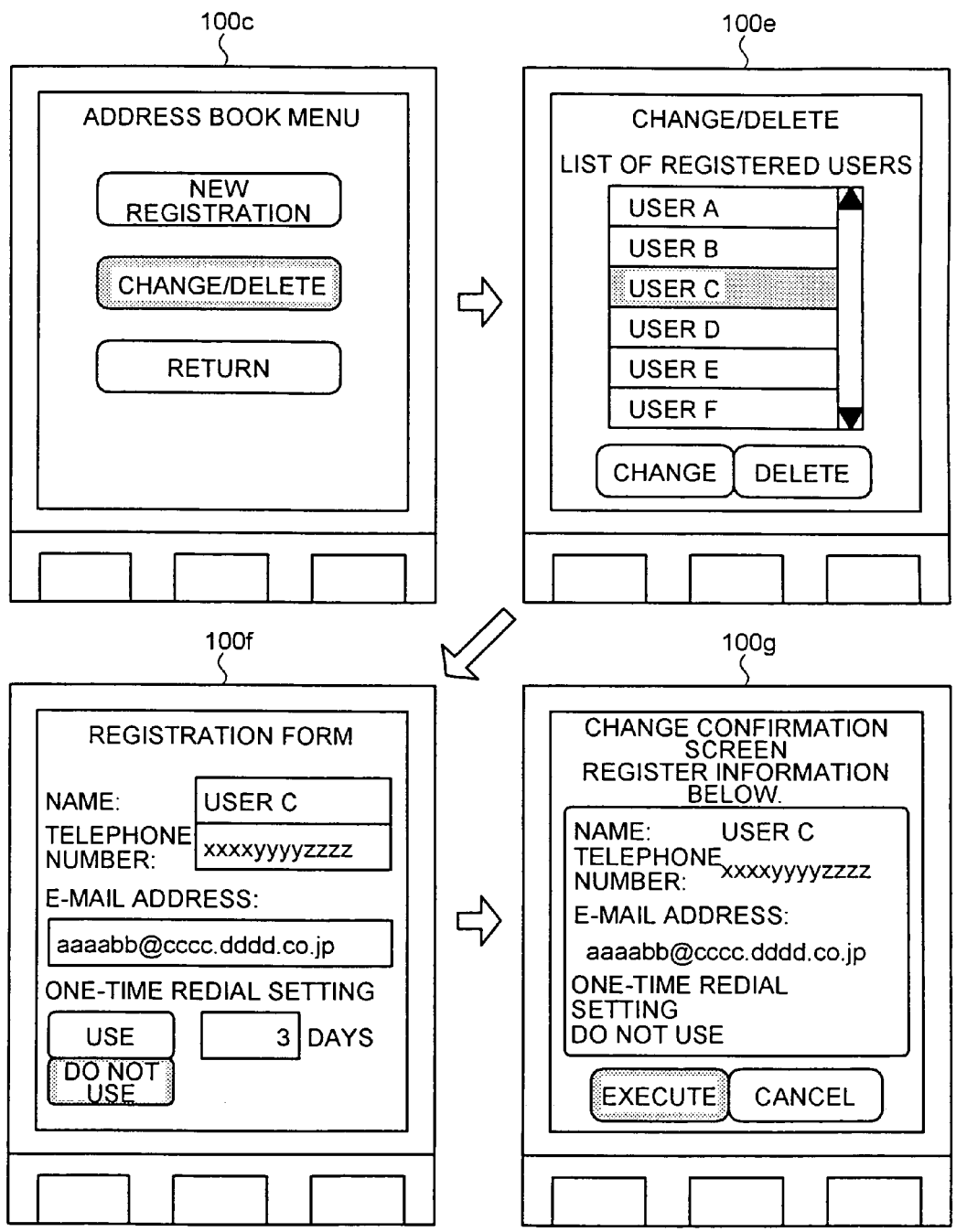
FIG. 9 is an example of screens displayed at a telephone terminal when "change/delete" is selected in an address-book edit menu.

At step S104 in FIG. 7, when a user selects "change/delete" in the address-book edit menu 100c, the edit processing unit 140 displays, at the requesting terminal, a change/delete screen 100e shown in FIG. 9.

When the user selects a user name from the change/delete screen 100e (user C is selected in FIG. 9), the edit processing unit 140 displays a screen 100f shown in FIG. 9 for changing information corresponding to the selected user. When the user changes the information, the edit processing unit 140 registers the information in the subscriber-number management table 130b, and displays, at the requesting terminal, a change confirmation screen 100g shown in FIG. 9.

Figure 10:
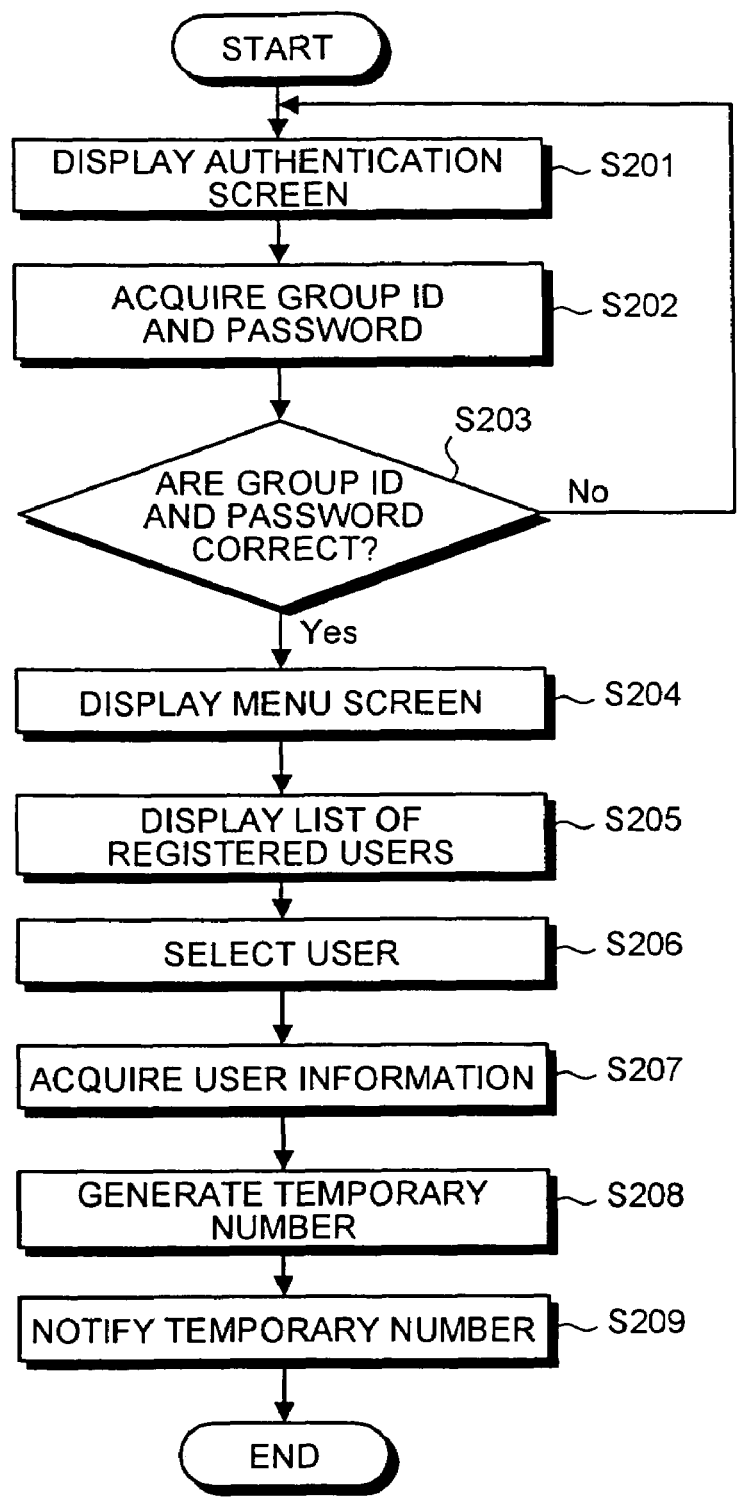
FIG. 10 is a flowchart of a processing procedure performed by the telephone-number management server for generating a provisional number.

FIG. 10 is a flowchart of a processing procedure performed by the telephone-number management server 100 for generating a provisional number. When the authentication processing unit 120 receives a request to access the telephone-number management server 100 from the telephone terminal 10 or the IP telephone terminal 20, the authentication processing unit 120 displays, at the requesting terminal, the authentication screen 100a shown in FIG. 8 (step S201).

When a user of the requesting terminal inputs a group ID and a password in the authentication screen 100a, the authentication processing unit 120 acquires the group ID and the password (step S202), determines whether the group ID and the password are correct by referring to the ID/password management table 130a (step S203). When the group ID and the password are incorrect (No at step S203), the system control returns to step S201.

Figure 11:
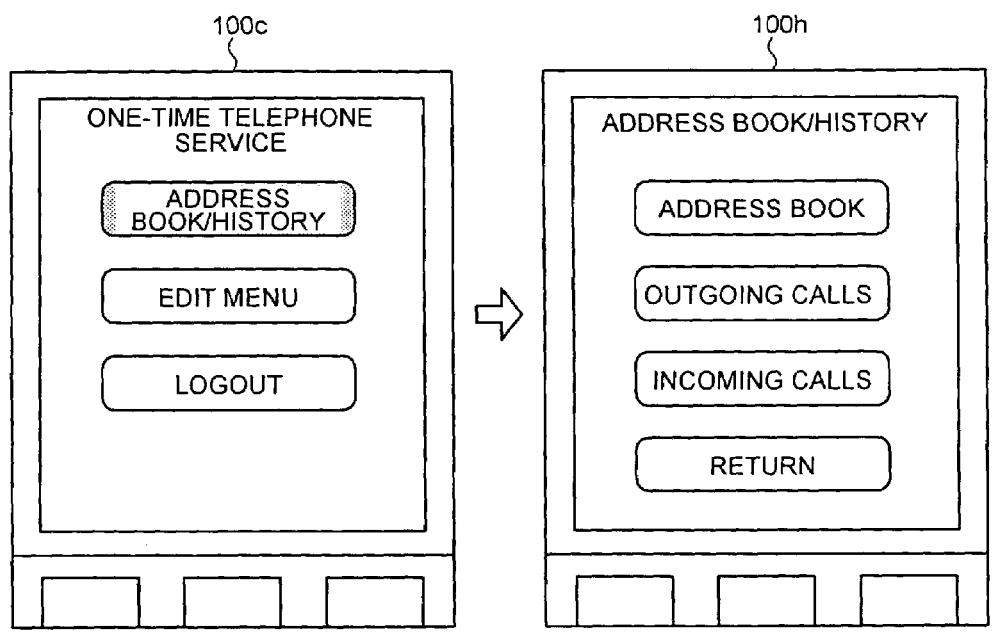
FIG. 11 is an example of an address-book/history screen.

On the other hand, when the group ID and the password are correct (Yes at step 203), the authentication processing unit 120 displays, at the requesting terminal, the menu screen 100b shown in FIG. 8 (step S204). When "address book/history" is selected in the menu screen 100b, the authentication processing unit 120 displays, at the requesting terminal, an address-book/history screen 100h shown in FIG. 11.

Figure 12:
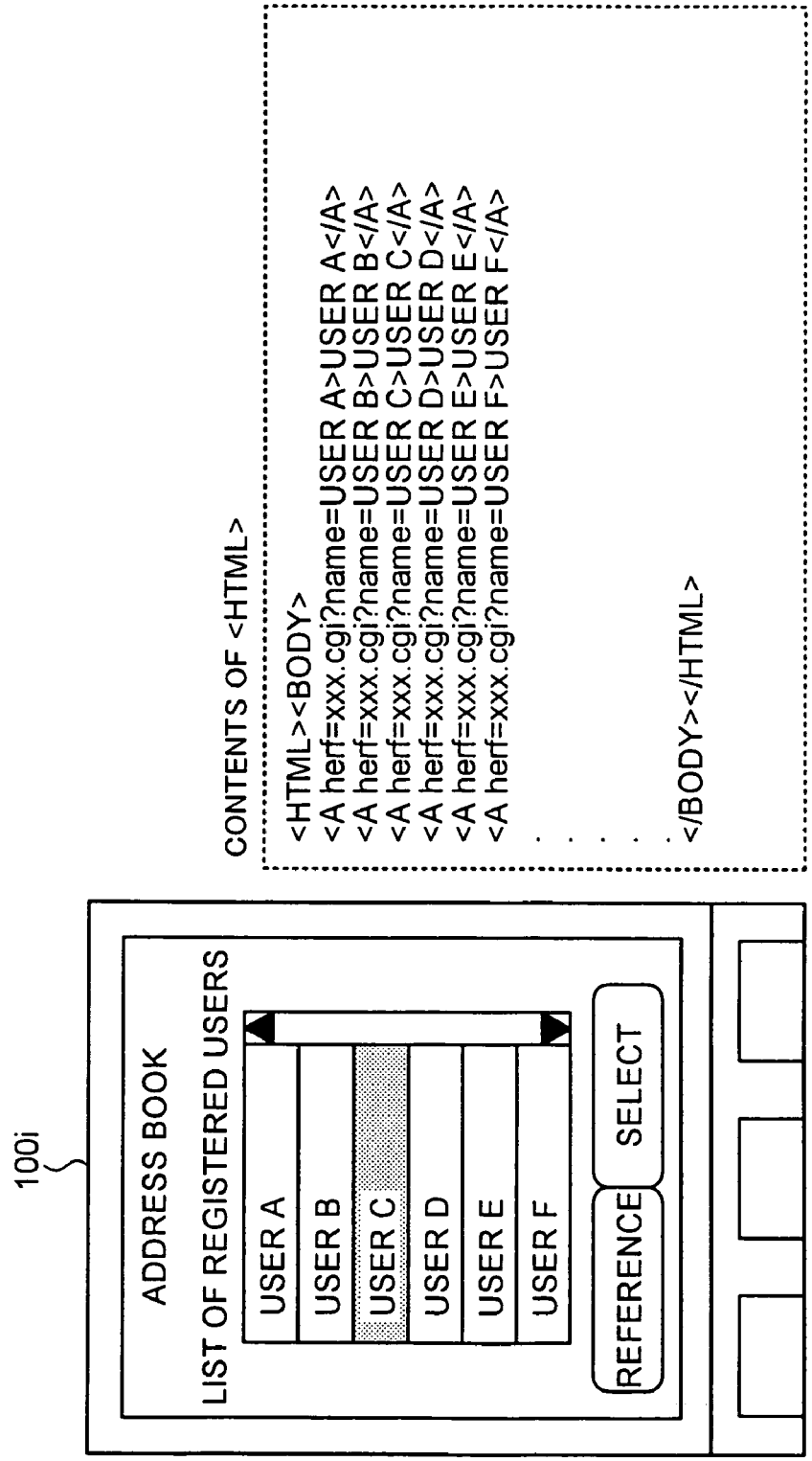
FIG. 12 is an example of a list of registered users.

When "address book" is selected in the address-book/history screen 100h, the authentication processing unit 120 displays, at the requesting terminal, a list of registered users 100i shown in FIG. 12 (step S205). The Hyper Text Markup Language (HTML) of the list of registered users 100i is also shown in FIG. 12.

When the user selects a user name from the list of registered users 100i, the user-group management unit 150 receives the selected user name (step S206), acquires information corresponding to the selected user from the subscriber-number management table 130b, and notifies the one-time-number management unit 160 of the user name (step S207).

The one-time-number management unit 160 generates a provisional number (step S208), and notifies the requesting terminal of the provisional number (step S209). The one-time-number management unit 160 displays, at the requesting terminal, a notification screen 100j shown in FIG. 13, to notify the receiver's provisional number.

Figure 13:
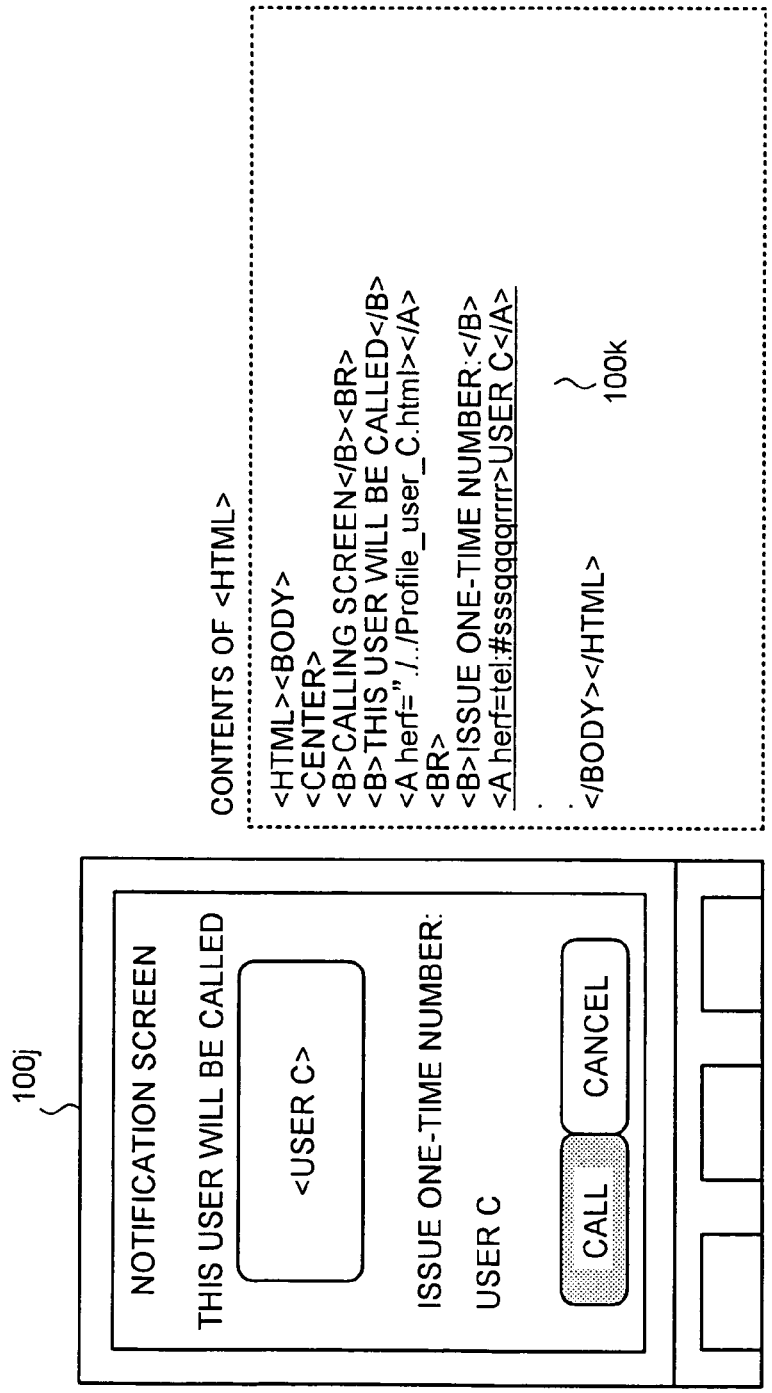
FIG. 13 is an example of a notification screen displayed at a telephone terminal when notifying a receiver's provisional number.

The HTML of the notification screen 100j is also shown in FIG. 13. An underlined description 100k in the HTML includes the receiver's provisional number. When the user of the requesting terminal selects "call" in the notification screen 100j, the receiver's provisional number is automatically transmitted to the telephone-number management server 100, so that the user can easily call the receiver.

Accordingly, the user-group management unit 150 displays the list of user names so that a caller selects a receiver's name. The one-time-number management unit 160 generates a provisional number corresponding to the selected user name, and transmits the provisional number to the caller's terminal. Thus, the caller can efficiently acquire the receiver's provisional number.

Figure 14:
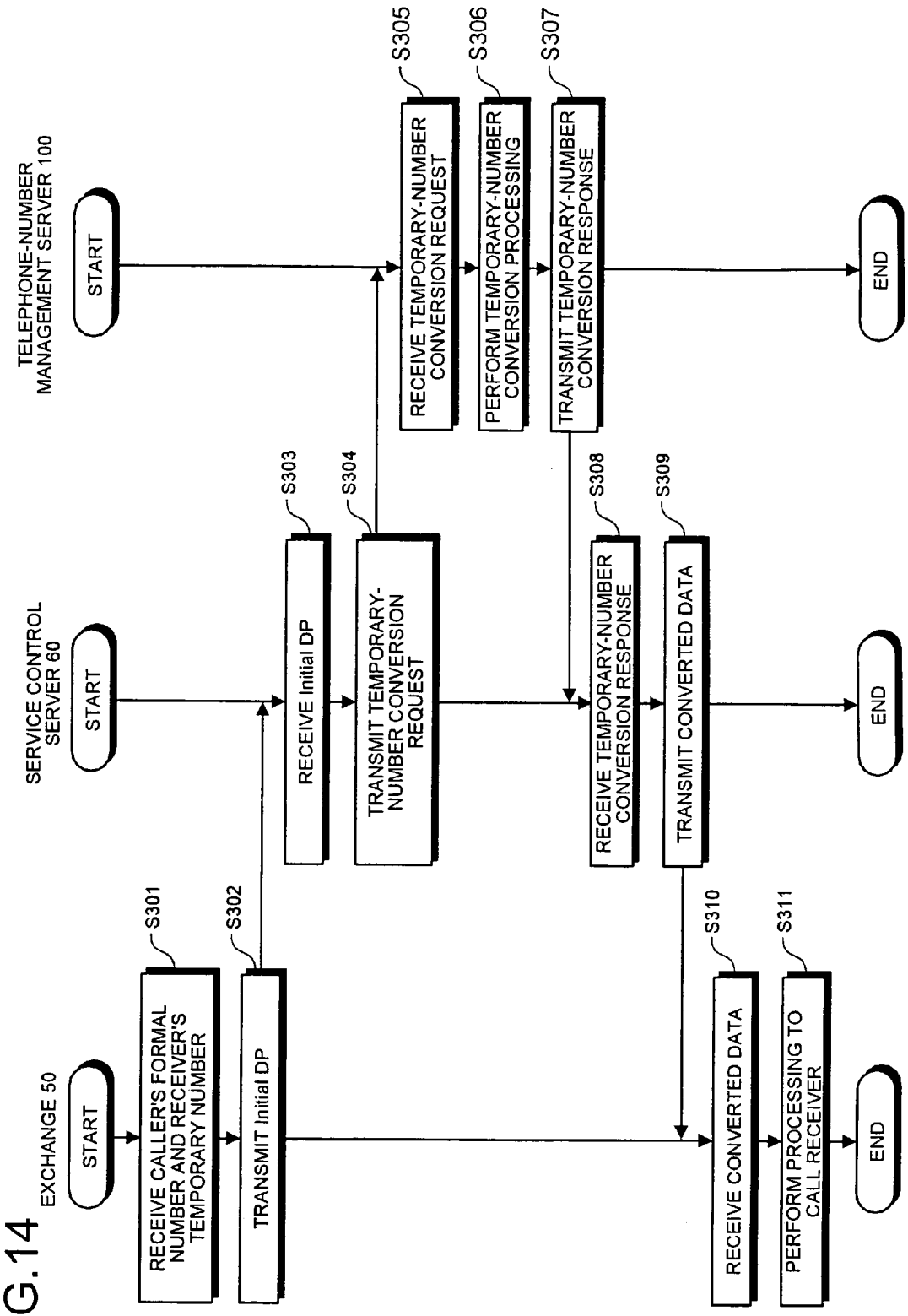
FIG. 14 is a flowchart of a processing procedure performed by the telephone-number management system for establishing a call.

FIG. 14 is a flowchart of a processing procedure performed by the telephone-number management system for establishing a call. In FIG. 14, it is assumed that the telephone terminal 10 makes a request to call a receiver's telephone terminal. The exchange 50 receives a caller's regular number and a receiver's provisional number from the telephone terminal 10 (step S301), and transmits an initial DP (including the caller's regular number and the receiver's provisional number) to the service control server 60 (step S302).

The service control server 60 receives the initial DP from the exchange 50 (step S303), transmits to the telephone-number management server 100 a provisional number conversion request to convert the receiver's provisional number to a regular number (step S304), and the telephone-number management server 100 receives the request (step S305).

The telephone-number management server 100 then performs a conversion processing to convert the receiver's provisional number to a regular number (step S306), and sends a provisional number conversion response (i.e., the receiver's regular number) to the service control server 60 (step S307).

The service control server 60 receives the provisional number conversion response (step S308), and transmits converted data (i.e., the caller's regular number and the receiver's regular number) to the exchange 50 (step S309). The exchange 50 receives the converted data (step S310), and performs a processing to call the receiver's telephone terminal (step S311).

Accordingly, a caller can call a receiver, without knowing the receiver's regular number, by requesting the receiver's provisional number from the telephone-number management server 100, and using the provisional number to call the receiver. Moreover, the provisional number expires after a predetermined time duration to enhance security.

When the telephone-number management server 100 notifies a receiver of a caller's provisional number, the receiver can use the provisional number to redial the caller. When the telephone-number management server 100 notifies a receiver of a caller's identification data only, the receiver requests history information from the telephone-number management server 100 and uses the history information to redial the caller.

Figure 15:
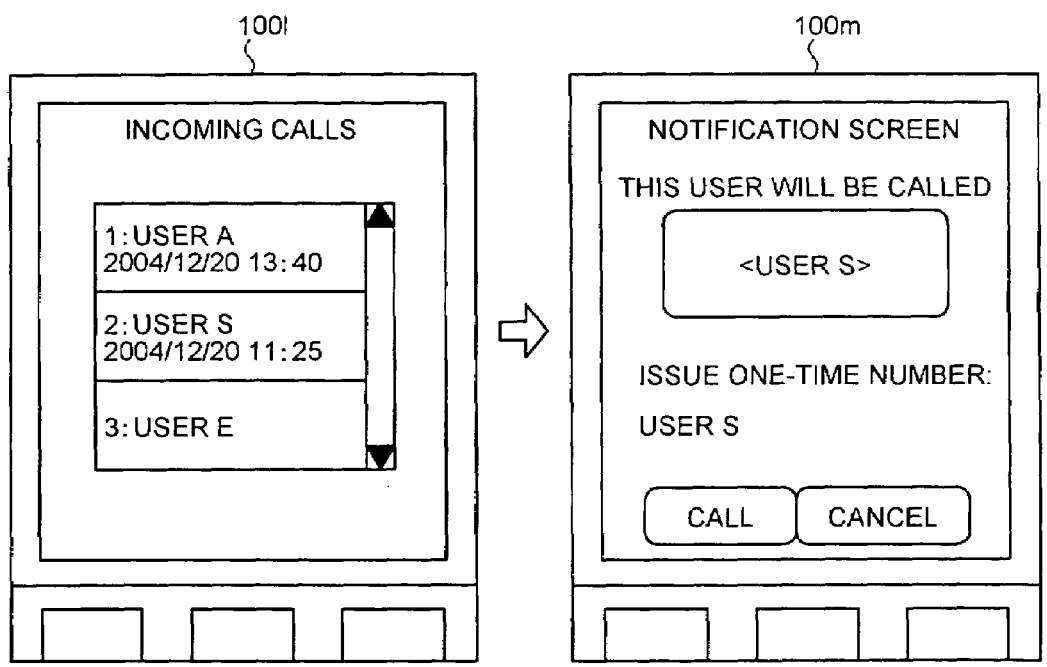
FIG. 15 is an example of an incoming-call register screen.

When the history-information management unit 170 receives a request to notify history information from a telephone terminal, the history-information management unit 170 displays, at the requesting terminal, an incoming-call register screen 1001 shown in FIG. 15. When a user selects a user name, the history-information management unit 170 requests the one-time-number management unit 160 to generate a provisional number corresponding to the selected user name, and transmits the provisional number to the requesting terminal.

When the telephone-number management server 100 receives a request to notify a receiver's provisional number from the telephone terminal 10, the one-time-number management unit 160 generates a provisional number, and transmits the provisional number to the telephone terminal 10. When the telephone-number management server 100 acquires a receiver's provisional number and a caller's regular number from the telephone terminal 10, the one-time-number management unit 160 converts the receiver's provisional number to a regular number, and notifies the exchange of the caller's regular number and the receiver's regular number. Thus, leakage of personal information such as telephone numbers can be prevented while establishing telephone calls quickly and efficiently.

As described above, according to the present invention, it is possible to prevent a leakage of a telephone number, and at the same time, to make a call quickly.

Furthermore, according to the present invention, a caller can acquire a provisional number of a receiver efficiently.

Moreover, according to the present invention, a caller can improve a safety for a telephone number.

Furthermore, according to the present invention, a receiver can make a telephone communication with a caller efficiently.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An apparatus for managing information regarding a telephone number of a user, the apparatus comprising:
    a storing unit that stores a first regular telephone number of a first telephone terminal of a first user and information indicating whether the first user approves redialing, and a second regular telephone number of a second terminal of a second user;
    a provisional-telephone-number generating unit that generates, in response to a request from the first telephone terminal, a first provisional telephone number of the first telephone terminal and a second provisional telephone number of the second telephone terminal, notifies the second provisional telephone number to the first telephone terminal, and stores the first and second provisional telephone numbers relative to the first and second regular telephone numbers respectively in the storing unit;
    a searching unit that searches the second regular telephone number corresponding to the second provisional number from the storing unit when the searching unit receives the second provisional telephone number and the first regular telephone number from the first telephone terminal; and
    a call establishing unit that establishes a call between the first telephone terminal and the second telephone terminal based on a result of the search, and notifies the first provisional telephone number to the second telephone terminal when the information stored in the storing unit indicates that the first telephone terminal appoves redialing.

2. The apparatus according to claim 1, wherein the provisional-telephone-number generating unit sets an expiration date for the provisional telephone number.

3. The apparatus according to claim 1, wherein the storing unit further stores history information including caller identification information for identifying the caller, date and time of an outgoing call made by the caller, receiver identification information for identifying the receiver, and date and time of an incoming call received by the receiver.

4. A method of managing information regarding a telephone number of a user, the method comprising:
    storing in a storing unit a first regular telephone number of a first telephone terminal of a first user and information indicating whether the first user approves redialing, and a second regular telephone number of a second telephone terminal of a second user;
    generating, in response to a request from the first telephone terminal, a first provisional telephone number of the first telephone terminal and a second provisional telephone number of the second telephone terminal;
    notifying the second provisional telephone number to the first telephone terminal;
    storing the first and second provisional telephone numbers relative to the first and second regular telephone numbers respectively in the storing unit;
    searching the second a regular telephone number corresponding to the second provisional number from the storing unit when the second provisional telephone number and the first regular telephone number are received from the first telephone terminal;
    establishing a call between the first telephone terminal and the second telephone terminal based on a result of the search; and
    notifying the first provisional telephone number to the second telephone terminal when the information stored in the storing unit indicates that the first telephone terminal approves redialing.

5. The method according to claim 4, wherein the generating includes setting an expiration date for the provisional telephone number.

6. The method according to claim 4, wherein the storing includes storing history information including caller identification information for identifying the caller, date and time of an outgoing call made by the caller, receiver identification information for identifying the receiver, and date and time of an incoming call received by the receiver.

7. A computer-readable recording medium that stores a computer program for managing information regarding a telephone number of a user, wherein the computer program causes a computer to execute;
    storing in storing unit a first regular telephone number of a first telephone terminal of a first user and information indicating whether the first user approves redialing, and a second regular telephone number of a second telephone terminal of a second user;

generating, in response to a request from the first telephone terminal, a first provisional telephone number of the first telephone terminal and a second provisional telephone number of the second telephone terminal;

notifying the second provisional telephone number to the first telephone terminal;

storing the first and second provisional telephone numbers relative to the first and second regular telephone numbers respectively in the storing unit;

searching the second a regular telephone number corresponding to the second provisional number from the storing unit when the second provisional telephone number and the first regular telephone number are received from the first telephone terminal;

establish a call between the first telephone terminal and the second telephone terminal based on a result of the search; and notifying the first provisional telephone number to the second telephone terminal when the information stored in the storing unit indicates that the first telephone terminal approves redialing.

8. The computer-readable recording medium according to claim 7, wherein the generating includes setting an expiration date for the provisional telephone number.

9. The computer-readable recording medium according to claim 7, wherein the storing includes storing history information including caller identification information for identifying the caller, date and time of an outgoing call made by the caller, receiver identification information for identifying the receiver, and date and time of an incoming call received by the receiver.

* * * * *